United States Patent
Orlando et al.

(10) Patent No.: US 12,339,967 B2
(45) Date of Patent: Jun. 24, 2025

(54) FIRMWARE AUTHENTICITY CHECK

(71) Applicant: Micron Technology, Inc., Boise, ID (US)

(72) Inventors: Alessandro Orlando, Milan (IT); Niccolo' Izzo, Vignate (IT); Danilo Caraccio, Milan (IT)

(73) Assignee: Micron Technology, Inc., Boise, ID (US)

( * ) Notice: Subject to any disclaimer, the term of this patent is extended or adjusted under 35 U.S.C. 154(b) by 326 days.

(21) Appl. No.: 17/682,928

(22) Filed: Feb. 28, 2022

(65) Prior Publication Data

US 2023/0274002 A1 Aug. 31, 2023

(51) Int. Cl.
*G06F 21/57* (2013.01)
*H04L 9/32* (2006.01)
*G06F 9/4401* (2018.01)

(52) U.S. Cl.
CPC .......... *G06F 21/572* (2013.01); *H04L 9/3263* (2013.01); *G06F 9/4406* (2013.01); *G06F 2221/033* (2013.01)

(58) Field of Classification Search
CPC .............. G06F 21/572; G06F 9/4406; G06F 2221/033; H04L 9/3263
USPC .......................................................... 713/189
See application file for complete search history.

(56) References Cited

U.S. PATENT DOCUMENTS

| | | | | |
|---|---|---|---|---|
| 5,694,583 A | * | 12/1997 | Williams | G06F 9/4406 703/24 |
| 7,343,496 B1 | * | 3/2008 | Hsiang | G07F 9/105 361/672 |
| 10,997,297 B1 | * | 5/2021 | Lin | H04L 9/30 |
| 2015/0113266 A1 | * | 4/2015 | Wooten | H04L 9/3234 713/155 |
| 2017/0185538 A1 | * | 6/2017 | Khan | G06F 21/88 |
| 2019/0042228 A1 | * | 2/2019 | Nolan | G06F 8/64 |
| 2019/0180822 A1 | * | 6/2019 | Dunga | G11C 13/0028 |

(Continued)

OTHER PUBLICATIONS

Parno, "Bootstrapping Trust in Commodity Computers", 2010, IEEE, pp. 414-428 (Year: 2010).*

(Continued)

*Primary Examiner* — Taghi T Arani
*Assistant Examiner* — Gregory A Lane
(74) *Attorney, Agent, or Firm* — Schwegman Lundberg & Woessner, P.A.

(57) ABSTRACT

Disclosed in some examples are methods, systems, and devices for authenticating a firmware object on a device and in some examples to safeguard the attestation process from the execution of malicious firmware. In some examples, a firmware update process may, in addition to updating the firmware on the device, write a hash of the authentic firmware code in a secure storage device (e.g., a register). This may be done in some examples in a protected environment (e.g., a trusted execution environment or a protected firmware update process). Upon first boot after the update, a firmware update checker compares the firmware object that is booted with the value of the secure storage device. If the values match, the alias certificate may be regenerated, and the boot continues. If the values do not match, then the alias certificate may not be regenerated, and the system may have an authenticity failure because the key and the certificate do not match.

19 Claims, 6 Drawing Sheets

(56) References Cited

U.S. PATENT DOCUMENTS

2021/0286742 A1* 9/2021 Schmidt .................. G06F 3/126
2022/0188419 A1* 6/2022 Stremlau ................... G06F 8/65
2022/0405392 A1* 12/2022 Nix ....................... H04L 9/3249

OTHER PUBLICATIONS

Xu, "Dominance as a new trusted computing primitive for the internet of things", 2019, IEEE, pp. 1-13 (Year: 2019).*
"DICE: Device Identifier Composition Engine", https: www.microsoft. com en-us research project dice-device-identifier-composition-engine Accessed on Jun. 10, 2020, (Jan. 1, 2015), 8 pgs.
"DICE Layering Architecture", [Online]. Retrieved from the Internet: URL: https: trustedcomputinggroup.org wp-content uploads DICE-Layering-Architecture-r19_pub.pdf, (Jul. 23, 2020), 30 pgs.
Pelosi, Sarah, "How the DICE standard delivers strong securtiy for IoT devices", [Online]. Retrieved from the Internet: URL: https: www.electronicproducts.com how-the-dice-standard-delivers-strong-security-for-iot-devices , (Aug. 21, 2020), 7 pgs.

* cited by examiner

FIRMWARE AUTHENTICITY CHECK

TECHNICAL FIELD

Embodiments pertain to improvements to attestation, identity, and software integrity checking methods for computing devices. Some embodiments relate to verifying that firmware objects loaded to a computing device are authorized.

BACKGROUND

Computing devices may communicate across one or more networks, busses, or interfaces, to other devices, servers, and the like to send or receive data, measurements, perform calculations, receive and provide services, and the like. A problem arises in that devices need to be able to authenticate each other. Various solutions have arisen to this problem, including using cryptographic keys that may be programmed into the device at manufacturing. While this solution is cost effective—utilizing a minimum of hardware and software complexity—there are some flaws with this approach.

First, if this cryptographic key is compromised, the security of the device may be irretrievably broken as attackers may use the key to impersonate the device and the key may not be conveniently updateable. If this happens, other devices may permanently lose trust in that device which may limit the utility of the device. In addition to compromising the key, attackers may load compromised software on the device. This may allow attackers to access sensitive data on this device or other devices communicating with this device. Other devices communicating with these devices may not be able to verify that the software executing on those devices is up to date and authentic and thus may not be able to ensure the safety of communications with this device. Software that is not up-to-date and authentic may have security vulnerabilities, may leak data, may be exploited, or the like.

Other solutions to this problem may lack some of the weaknesses of the above solution, however, these other solutions are often more expensive in terms of hardware and software implementation. For example, a trusted platform module (TPM) is a cryptographic processor designed for platform device authentication. While the TPM may reduce or eliminate one or more of the above problems, the inclusion of a TPM increases both the complexity and cost of devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Device Identifier Composition Engine (DICE) is a security standard promulgated by the Trusted Computing Group (TCG) that attempts to solve the problems described above in the background section while keeping complexity to a minimum. DICE aims to protect the cryptographic key of devices, provide mechanisms for updating one or more of the keys in case they are compromised, and to provide for remote attestation of the device software.

DICE accomplishes this goal by having a protected device secret only accessible by very secure and low layer code (termed a DICE layer). This DICE layer code then uses the measurement of the next code layer (layer zero) and the device secret as input to a one-way function to create a Compound Device Identifier (CDI). This CDI may then be used by layer zero code along with a measurement of the layer one code as inputs to a one-way function to create a second CDI. Each layer of software in the system may subsequently create a CDI by using the CDI provided by the previous layer along with the measurement of the next layer as inputs to a one-way function. Each CDI value is an accumulation of the measurements of the preceding software layers.

In addition, the various CDI values of each layer may be used to create symmetric or asymmetric cryptographic keys. These keys may then be used to create and sign certificates that are used to identify the device. Each layer of the device is charged with protecting its own CDI. Since each layer has its own CDI that depends on its own measurements, if a CDI is compromised, or the software in the layer changes, the device will restore trust by creating new CDIs for that layer and all layers that depend on that layer. DICE may also generate one or more certificates that may be signed by the device manufacturer. This may allow other relying devices to trust the keys given by the device.

Figure 1:
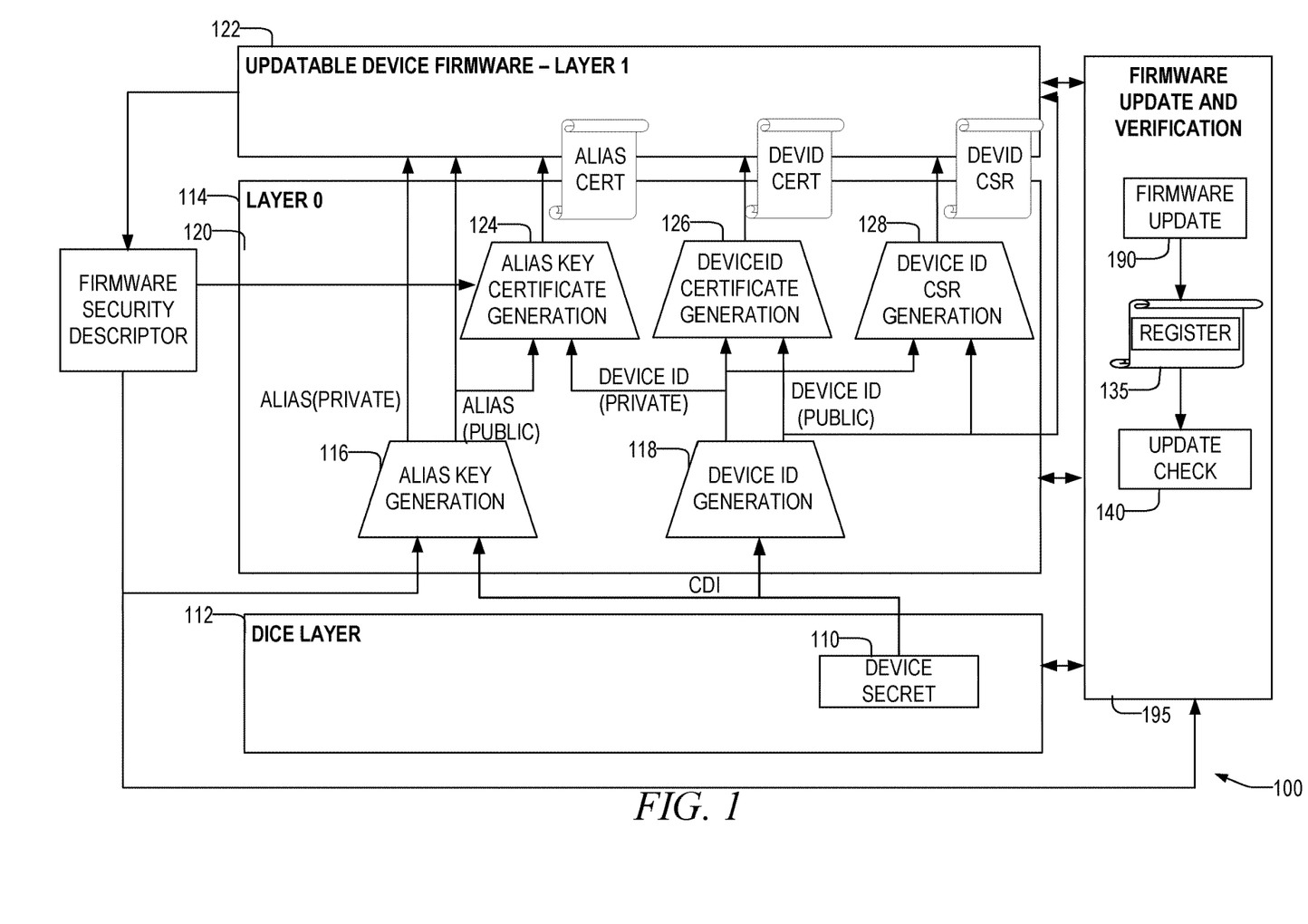
FIG. 1 illustrates a logical diagram of a computing device implementing a DICE protocol according to some examples of the present disclosure.

FIG. 1 illustrates a logical diagram of a computing device 100 implementing a DICE protocol according to some examples of the present disclosure. As previously described, DICE defines compound device identifier and certificate chaining rules that allow devices to authenticate themselves and their configuration. DICE identifies computing devices by utilizing a unique device secret (UDS) 110. The UDS may be a cryptographic key, a random number programmed at the time of manufacturing, a number derived by the manufacturer, or the like. The computing device 100 may protect the UDS 110 from access by software other than a DICE layer 112 by hardware latches, fuses, or the like. For example, upon exiting, DICE layer 112 may disable access to the UDS using a latching or fuse mechanism. In other examples, the UDS may be stored in one or more fuses or memory locations that are only accessible in a trusted execution environment (TEE) where the DICE layer 112 executes. In some examples, only processes in the TEE may read or access these fuses or memory locations. These restrictions may be enforced, in some examples, by hardware structures within a processor of the computing device.

The DICE layer 112 executes upon device boot prior to a loading of the firmware layer and processes the UDS 110 to create a Compound Device Identity (CDI). The CDI may be calculated in some examples using a one-way function, such as a hash, a hash-based message authentication code HMAC or the like applied to the UDS and a measurement of the layer zero code 114. The CDI may then be passed to the layer zero code 114. Layer zero code 114 may then generate a firmware security descriptor 120 which may be a cryptographic hash of the updateable device firmware 122. If the firmware security descriptor 120 is invalid or missing, or the system cannot create the firmware descriptor, then further key generation is aborted and the system may cleanup operations and delete RAM and other registers, such as those storing the CDI.

In addition, the layer zero code 114 may generate a Device ID key pair 118, which may be an asymmetric key pair that is created using a deterministic key generation function seeded with the CDI. The Device ID key pair 118 may be a same value on each boot. The public key of the device id key pair may be exported to the updatable device firmware 122, and the private key may be used in other functions. The DeviceID keys and certificate may serve as a long-term identifier for a device. This key pair reflects the combined hardware identity of the device and the layer zero code 114.

Layer zero code 114 may also generate an asymmetric alias key pair 116. The alias key uses a deterministic key generation function seeded with both the CDI and the firmware security descriptor 120. That is, the alias key pair may depend on both the CDI and the device firmware. Both public and private keys of the alias key pair may be provided to the updatable device firmware 122. In contrast to the DeviceID credentials, new Alias Keys and credentials may change—e.g., such as when the firmware is updated. The primary function of the DeviceID keys is to establish device identity and certify Alias Keys.

In some examples, the layer zero code 114 may also generate an alias key certificate 124 using the public alias key and the private device ID. For example, the layer zero code 114 may create a certificate containing the alias public key and sign it with the private Device ID key. This certificate may be exported to the updatable device firmware 122. Additionally, the layer zero code 114 may create a DEVICE ID certificate 126 with the public key of the Device ID and sign it with the Device ID private key. This may be sent to the updatable device firmware 122. Finally, in some examples, a Device ID certificate signing request (CSR) 128 may also be created using the public key of the Device ID signed by the Device ID private key to assist in generating digital certificates and simplify manufacturing flows. The device may authenticate itself to other devices with the certificates, such as the Device ID certificate 126, or Alias Certificate.

In some examples, the updatable device firmware 122 may load additional layers. The updatable device firmware 122 may use the Alias Key issued to it on this boot but should not expose the private portion of the Alias Key to other entities. As noted, each layer of software in the system may create a CDI by using the CDI of the previous layer along with the measurement of the next layer as inputs to a one-way function. The CDI may then be used to generate keys and certificates. Through this chaining, each layer in a software stack may get a unique CDI, key (called an alias key), and certificate to encode its identity.

As can be appreciated from the above description, the CDIs, alias keys, and certificates are generated based upon measurements of software images. If the measurements of the software images changes, the alias keys and certificates will change. For example, if the updatable device firmware 122 is manipulated or replaced with malicious code, the Alias key pair is altered. A certificate is then generated, and signed, according to the DICE protocol for this new key pair. Any further keys and certificates created by other software from these keys will also be different as each key in the chain depends on the previous key.

The key chaining of the DICE protocol may alert other devices to a change in software on the device (because the key changes), however, there is no way for either the device itself, or another device to verify that the firmware objects loaded are authorized by a device vendor. For example, the key may change because of an authorized and legitimate firmware update; or the key may change because of an unauthorized and illegitimate firmware update. So, while the relying device may recognize the key change, these devices may have no way of knowing whether the updated key is legitimate. To detect a malicious change, the relying devices would have to store a list of authorized key values and have that list be updated regularly. This presents serious burdens on relying devices, such as needing increased memory capacity to store the allowed lists, network access to receive updates, and the like. Furthermore, even if relying devices may detect the device is running unauthorized code, the devices themselves will not be able to prevent the execution of this unauthorized code.

Disclosed in some examples are methods, systems, and devices for authenticating a firmware object on a device and in some examples to safeguard the attestation process from the execution of malicious firmware. In some examples, a firmware update and verification component 195, may, in addition to updating the firmware on the device (e.g., via firmware update component 190), write a hash of the authentic firmware code in a secure storage device such as a secure register (e.g., register 135). The secure register (register 135) may be persistent through a reset of the device. This may be done in some examples in a protected environment (e.g., a trusted execution environment or a protected firmware update process). Upon first boot after the update, a firmware update checker (e.g., firmware update check component 140), compares a measurement of the firmware object that is booted (e.g., the firmware security descriptor 120) with the value stored in the secure storage device (e.g., register 135). If the values match, the alias certificate may be regenerated (e.g., via a regeneration signal), and the boot continues. If the values do not match, then the alias certificate may not be regenerated, and the system may have an authenticity failure because the key and the certificate do not match. The system may take steps to alert a user, management device, or the like of the failure. In some examples, the device may halt and may refuse to load the invalid firmware. As shown, the firmware update and verification 195 is shown as a standalone layer. In other examples, one or more aspects of the firmware update and verification component 195 may be implemented as part of the DICE layer 112, layer zero code 114, the updatable device firmware (layer 1) 122, or may be part of a different layer.

The present disclosure thus solves the technical problem of unauthorized firmware execution on a computing device with a technical solution of checking, prior to execution of a new firmware image, of a measurement of the new firmware image with a value stored in a secure storage device by a secure firmware update process. This combines with DICE to ensure that the certificate for the alias key only matches the key if the firmware object is authorized.

Figure 2:
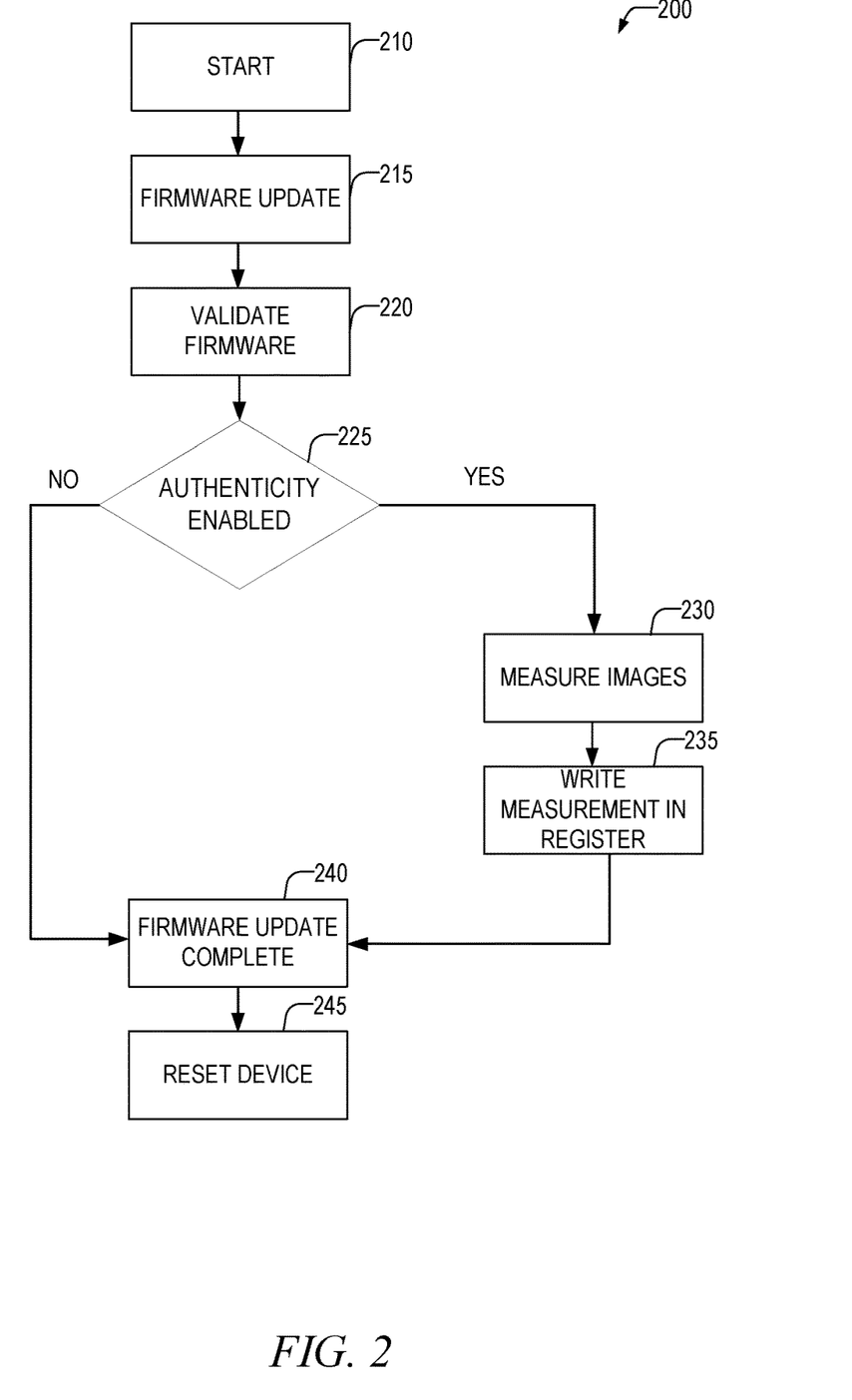
FIG. 2 illustrates a firmware update process according to some examples of the present disclosure.

FIG. 2 illustrates a method 200 of a firmware update process according to some examples of the present disclosure. The operations of FIG. 2 may be performed by the device, for example, in a secure field firmware update process (e.g., a firmware update component 190 of FIG. 1), implemented by, for example, a firmware update component 190. At operation 210, the firmware update process on a device is started. For example, another device issues a firmware update command and supplies an updated firmware object. This may cause the device to go into a firmware update mode where other operations are suspended. In some examples, the device may reboot to enter this mode. Either prior to entering this mode, or once this mode is entered, the computing device may check to see that the requestor is authorized to update the firmware and may check to ensure that the updated firmware object transferred successfully (e.g., using a parity calculation, or the like).

At operation 215, the firmware is updated. For example, the new firmware is written to a firmware storage memory location of the device—such as a flash memory location, a static random-access memory (SRAM), a Complementary metal-oxide-semiconductor (CMOS), or the like. At operation 220 the new firmware may be validated. For example, a checksum or hash of the firmware may be compared with an expected checksum or hash to ensure the firmware was written to the firmware storage memory correctly and is free from errors.

At operation 225 the device determines whether an authenticity feature is enabled. For example, the device may operate in a first mode that does not have an authenticity feature enabled and a second mode in which the authenticity feature is enabled. For example, by checking a flag that may be a value of a register, a status of a fuse, an e-fuse, or the like may be checked to determine whether the feature is enabled or disabled. The flag may be protected with one or more of the same protections as the device secret. If the feature is not enabled, then control proceeds to operation 240.

If the authenticity feature is enabled, then at operation 230, the system may measure the newly installed firmware object or images. For example, a cryptographic hash of the image, such as the firmware security descriptor 120. At operation 235 the measurements may be written into one or more secure storage devices, such as one or more secure registers of the device. The secure storage device may be any non-volatile memory that may be protected from access. Examples include one or more registers, fuses, e-fuses, anti-fuses, replay-protected memory blocks (RPMB), flash memory cells, magnetic memory cells, or the like. For example, the secure storage device may only accessible to the trusted firmware update process and early boot code, such as the DICE layer 112 or the layer zero code 114. The secure storage device may be protected similarly to the UDS 110 by latches or may be stored in fuses, e-fuses, or the like. In some examples, the secure storage device may be a set of one or more fuses or e-fuses. In other examples, outside of the firmware update process, the secure storage devices may be read only. In still other examples, to access the secure storage devices, an update cryptographic key may be required. This key may be provided by the device requesting the update. If the key is correct, the secure storage device may be written. An example of this type of system may be a RPMB, such as a NAND flash RPMB region. In examples in which the RPMB is used, the counter that is also supplied may also be supplied by the device requesting the firmware update process or may be supplied by the device itself by keeping a count of the number of firmware updates. Once the secure storage devices are written with the measurement, the firmware update process is completed at operation 240 and the device is reset at operation 245.

Figure 3:
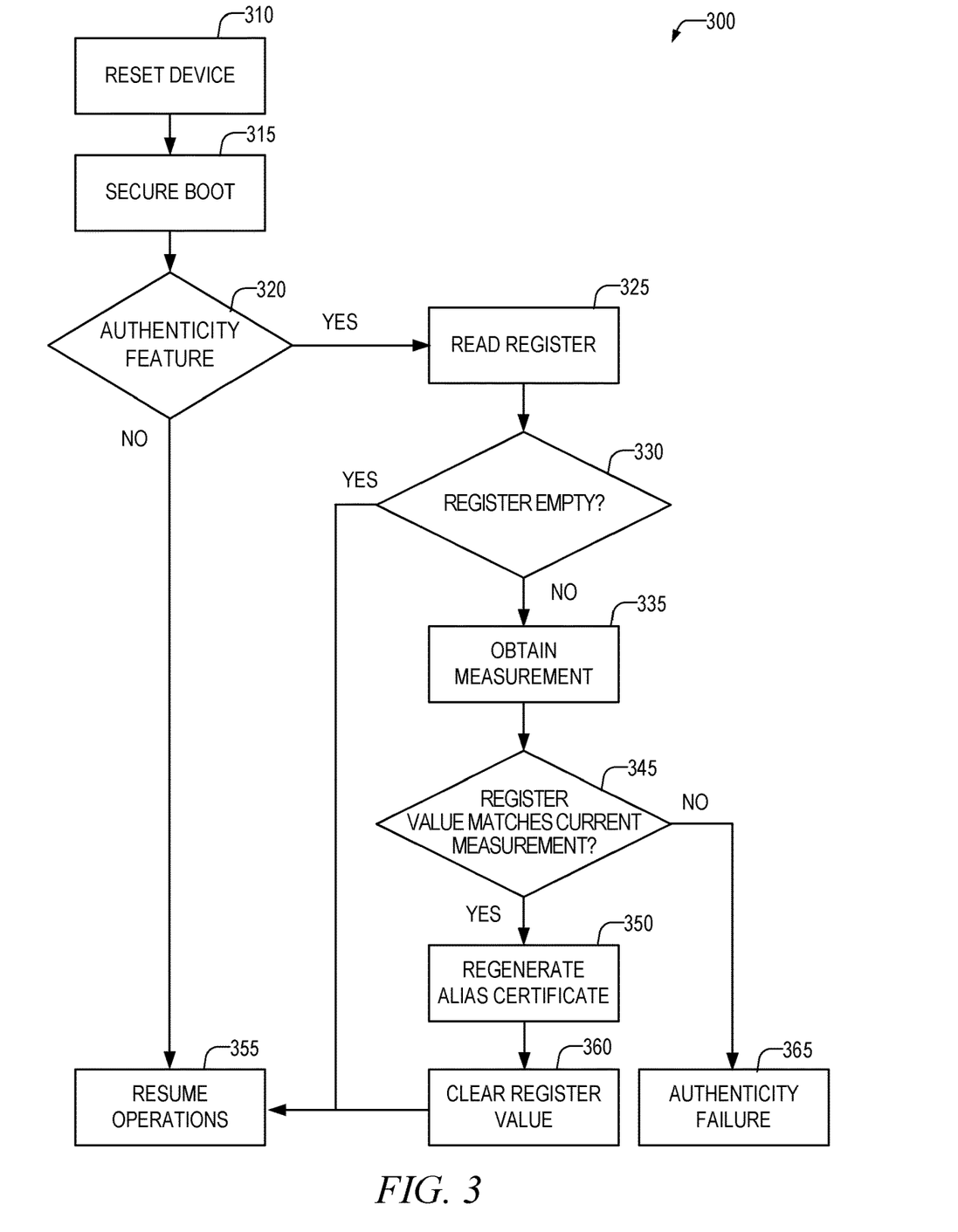
FIG. 3 illustrates an authenticity check method according to some examples of the present disclosure.

FIG. 3 illustrates an authenticity check method 300 according to some examples of the present disclosure. After the device resets at operation 310 (continuing, in some examples, from operation 245 of FIG. 2), the device enters the secure boot stage 315. For example, a DICE layer 112 may begin executing. A determination is made at operation 320 of whether the authenticity feature is enabled. For example, by examining a state of one or more protected registers, fuses, e-fuses, or the like. The feature may be set by a manufacturer during manufacturing or in some examples, may be enabled or disabled by firmware, or remotely. If the authenticity feature is not enabled, then operation continues to the creation of alias keys and certificates as per standard DICE as shown in FIG. 1 at operation 355. If there was a malicious firmware installed on the device, the system will generate a new alias key and a certificate—which may be signed by the device manufacturer. As previously discussed, the device may be compromised by the malicious firmware and other devices may mistakenly rely upon the alias key and certificate.

In other examples, at operation 320, the authenticity feature may be enabled. In that instance, the value stored in the secure storage device set during the firmware update may be read at operation 325. A determination is made as to whether the secure storage device is empty (e.g., based upon the value read being an invalid value) at operation 330. If the secure storage device is empty, then either the firmware was not updated, or a malicious firmware was loaded without modifying the value in the secure storage device. In this example, the device may resume normal operations at operation 355, however, in some examples, the alias certificate may not be updated. In some examples, once the authenticity feature is enabled, the alias certificate may only be regenerated after a firmware update in which the value stored in the secure storage device matches the measurement of the firmware on the device. In these examples, if the firmware was updated, but the secure storage device was not properly set, the alias key will not match the alias certificate. Thus, the device will fail attestation.

If the secure storage device is not empty at operation 330, the measurement of the firmware stored on the device may be taken at operation 335. For example, a cryptographic hash. At operation 345, the measurement may be compared with the stored measurement in the secure storage device. If there is no match, then there is an authenticity failure at operation 365. In some examples, at this point the device may take one or more actions such as halting operations, printing an error message (if the device has a display), sending an error message to a management server or other device, showing a visual indication, playing an auditory indication, or the like. If at operation 345, the measurement matches the measurement stored in the secure storage device, the system may regenerate the alias certificate 350 and clear the secure storage device value at operation 360. Once the alias key and certificate are regenerated, the device may authenticate with other devices successfully. In some examples, the operations of 320, 325, 330, 335, 345, 350, 360, and 365 may be performed by an update check component, such as firmware update check component 140 of FIG. 1. In some examples, various operations of FIG. 3 may be performed by a firmware update check component 140, a layer zero code 114, or some combination.

Figure 4:
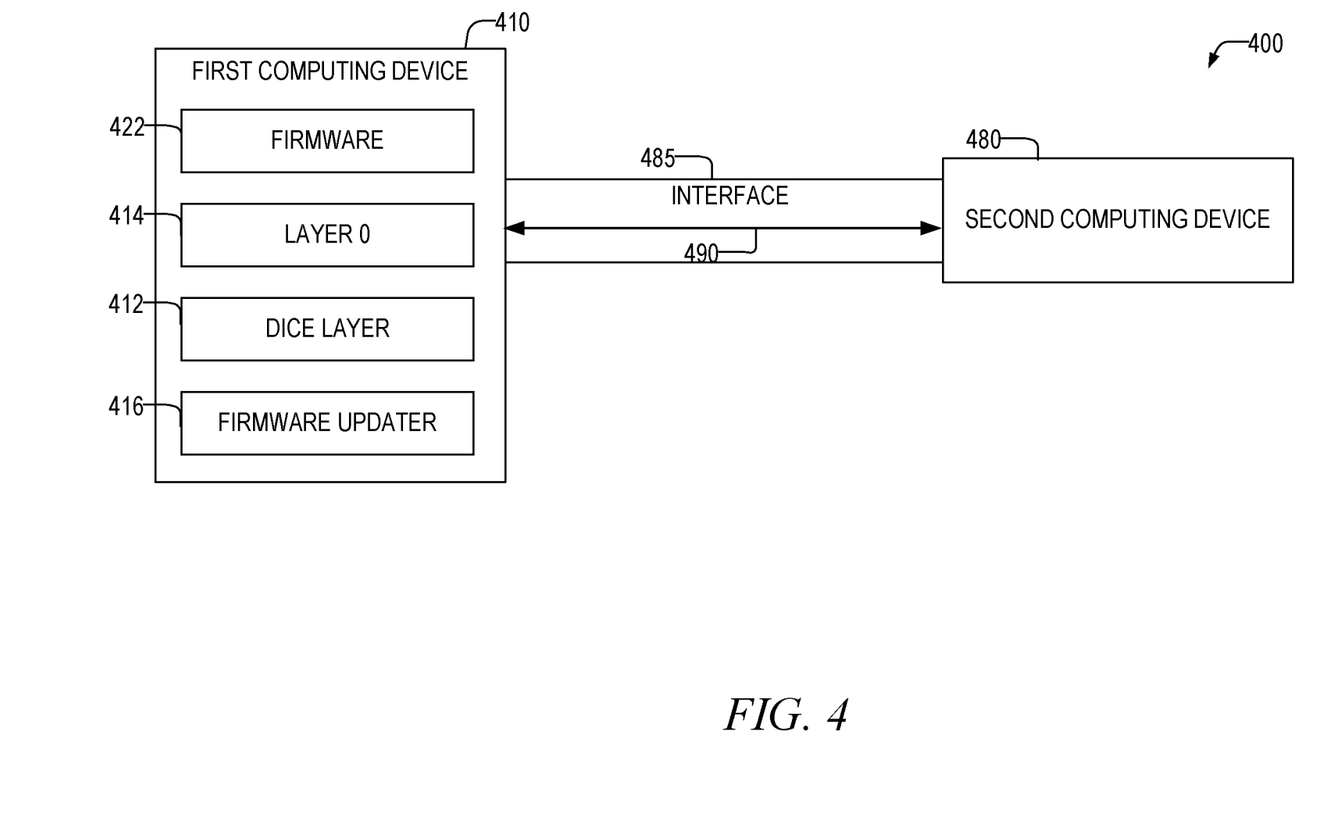
FIG. 4 illustrates a block diagram of an example authentication environment including a first computing device and a second computing device.

As used herein, the term computing device may encompass an entire computing device (a discrete computing device) or may refer to a component thereof. FIG. 4 illustrates a block diagram of an example authentication environment 400 including a first computing device 410 and a second computing device 480. Second computing device 480 relies upon the attestation of the first computing device 410. First computing device 410 may use the alias, or other key, along with the alias certificate to authenticate 490 with the second computing device 480 across an interface 485. In some examples, the authentication may be performed through a challenge-response protocol, or other proof of knowledge scheme. In some examples, the interface 485 is a chiplet interface and the first computing device 410 is a chiplet in a chiplet system and the second computing device 480 may be a second chiplet in the chiplet system. Interface 485 may be a packet-based chiplet interface. In other examples, the interface may be a Compute eXpress Link (CXL) that may be over a physical interface such as a Peripheral Component Interconnect express (PCIe) interface. In still other examples, other interfaces such as Universal Flash Storage (UFS) interface, a non-volatile memory host controller interface Specification (NVMe) interface, a Serial AT Attachment (SATA) interface, or the like. In these examples, the authentication environment 400 may be a host device and the first computing device 410 and the second computing device 480 may be one or more components of the host device. For example, the first computing device 410 may be a memory device and the second computing device 480 may be a processor. In still other examples, the interface 485 may be over a network, such as an Internet, an intranet, or the like and first computing device 410 and second computing device 480 may be discrete computing devices.

Figure 6:
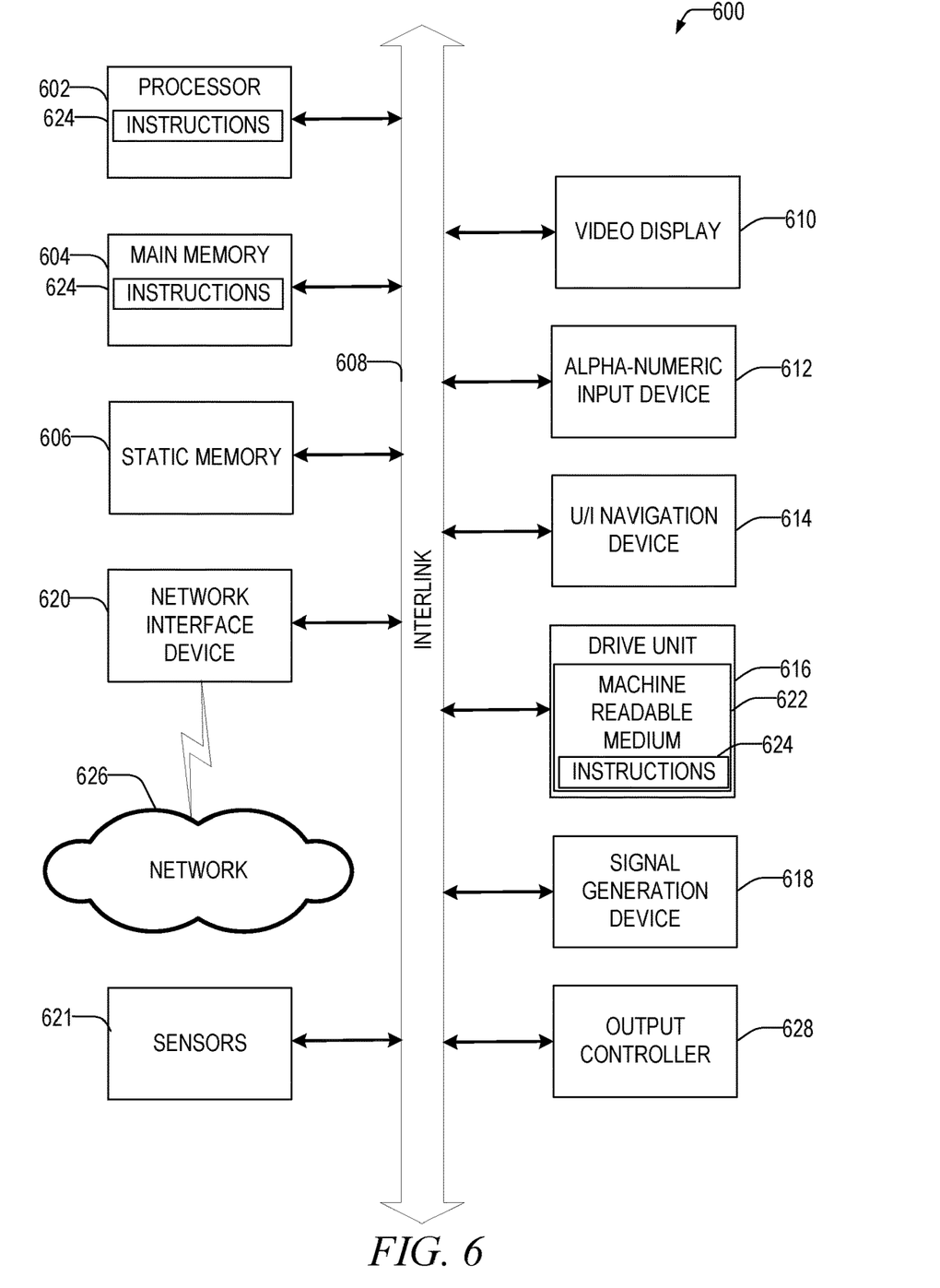
FIG. 6 illustrates a block diagram of an example machine upon which any one or more of the techniques (e.g., methodologies) discussed herein may be performed.

As previously noted, first computing device 410 and second computing device 480 may be a discrete computing device, such as shown in FIG. 6, or may be one or more components of a computing device, such as those shown in FIG. 6. For example, the first computing device 410 and/or the second computing device 480 may be a desktop, laptop, mobile device, Internet of Things (IoT) device. In other examples, the first computing device 410 and/or the second computing device 480 may be a component of a larger computing device. For example, the first computing device 410 and/or the second computing device 480 may be a memory device (e.g., a flash storage device, a NAND device, a Solid-State Drive (SSD), a Hard Drive, an optical storage device, or the like), a graphics processing device, a network interface device, or the like.

First computing device 410 may include a firmware layer 422, a layer zero code 414, a DICE layer 412, and a firmware updater 416 (which may be part of the DICE layer 412, or the firmware layer 422). In some examples, the firmware update process may be done inside firmware 422 and the cryptographic validation performed by the firmware updater 416. Firmware layer 422 may be an example of updatable device firmware 122 of FIG. 1. Firmware layer 422 may provide low-level control of the hardware of the device and in some examples may manage the device. In some examples, additional layers above the firmware layer 422 may be present and may utilize interfaces to the hardware provided by the firmware. In other examples, the firmware layer 422 may provide the software instructions to control the device, e.g., perform operations specified by the memory controller 515 of FIG. 5. Layer zero code 414 may be an example of layer zero code 114 of FIG. 1, and may perform the functions described in FIG. 1 for the layer zero code 114. DICE layer 412 may be an example of DICE layer 112 of FIG. 1 and perform the functions described in FIG. 1 for the DICE layer 112.

Figure 5:
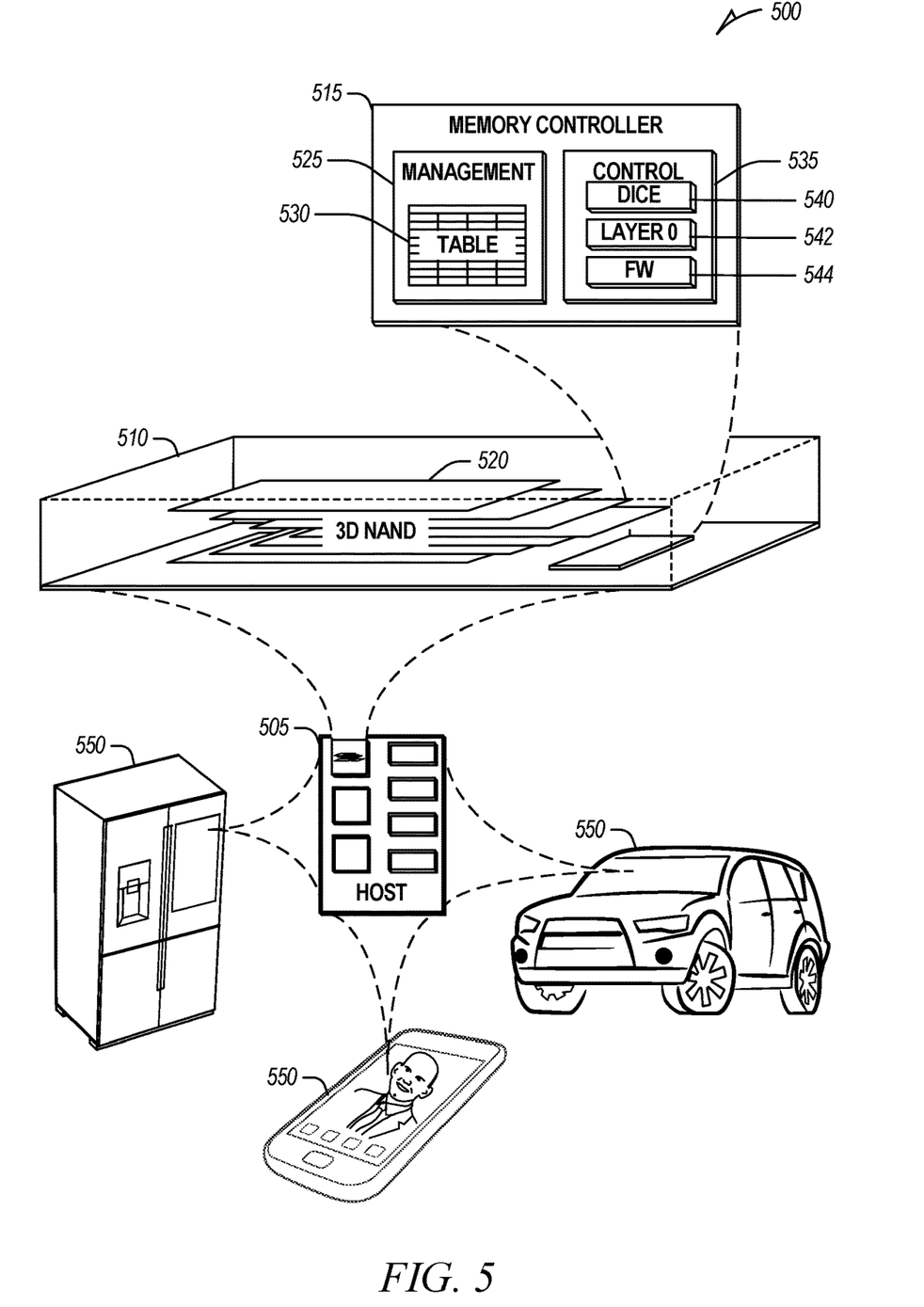
FIG. 5 illustrates an example of an environment including a discrete computing device in the form of a host device and a memory device configured to communicate over a communication interface.

FIG. 5 illustrates an example of an environment 500 including a discrete computing device in the form of a host device 505 and a memory device 510 configured to communicate over a communication interface. The host device 505 or the memory device 510 may be included in a variety of products 550, such as Internet of Things (IoT) devices (e.g., a refrigerator or other appliance, sensor, motor or actuator, mobile communication device, automobile, drone, etc.) to support processing, communications, or control of the product 550. The environment 500 may be an example of FIG. 4 in which the first computing device 410 and the second computing device 480 may be components of a host device 505. In these examples, the various components, such as the memory controller 515 of the memory device 510 may authenticate with other components of the host device 505 via the methods disclosed herein. In some examples, the environment 500 may be an example of FIG. 4 in which the first computing device 410 and the second computing device 480 are different computing devices authenticating with each other over a network. In these examples, host device 505 may authenticate with a server, or another host device over a network.

The memory device 510 includes a memory controller 515 and a memory array 520 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 510 can be a discrete memory or storage device component of the host device 505. In other examples, the memory device 510 can be a portion of an integrated circuit (e.g., system on a chip (SOC), etc.), stacked or otherwise included with one or more other components of the host device 505.

One or more communication interfaces can be used to transfer data between the memory device 510 and one or more other components of the host device 505, such as a Serial Advanced Technology Attachment (SATA) interface, a Peripheral Component Interconnect express (PCIe) interface, a CXL interface, a Universal Serial Bus (USB) interface, a Universal Flash Storage (UFS) interface, an eMMC™ interface, or one or more other connectors or interfaces. The host device 505 can include a host system, an electronic device, a processor, a memory card reader, or one or more other electronic devices external to the memory device 510. In some examples, the host device 505 may be a machine having some portion, or all, of the components discussed in reference to the machine 600 of FIG. 6.

The memory controller 515 can receive instructions from the host device 505, and can communicate with the memory array, such as to transfer data to (e.g., write or erase) or from (e.g., read) one or more of the memory cells, planes, sub-blocks, blocks, or pages of the memory array. The memory controller 515 can include, among other things, circuitry, or firmware, including one or more components or integrated circuits. For example, the memory controller 515 can include one or more memory control units, circuits, or components configured to control access across the memory array 520 and to provide a translation layer between the host device 505 and the memory device 510. The memory controller 515 can include one or more input/output (I/O) circuits, lines, or interfaces to transfer data to or from the memory array 520. The memory controller 515 can include a memory manager 525 and an array controller 535.

The memory manager 525 can include, among other things, circuitry, or firmware, such as a number of components or integrated circuits associated with various memory management functions. For purposes of the present description example memory operation and management functions will be described in the context of NAND memory. Persons skilled in the art will recognize that other forms of non-volatile or volatile memory may have analogous memory operations or management functions. Such NAND management functions include wear leveling (e.g., garbage collection or reclamation), error detection or correction, block retirement, or one or more other memory management functions. The memory manager 525 can parse or format host commands (e.g., commands received from a host) into device commands (e.g., commands associated with operation of a memory array, etc.), or generate device commands (e.g., to accomplish various memory management functions) for the array controller 535 or one or more other components of the memory device 510.

The memory manager 525 can include a set of management tables 530 configured to maintain various information associated with one or more component of the memory device 510 (e.g., various information associated with a memory array or one or more memory cells coupled to the memory controller 515). For example, the management tables 530 can include information regarding block age, block erase count, error history, or one or more error counts (e.g., a write operation error count, a read bit error count, a read operation error count, an erase error count, etc.) for one or more blocks of memory cells coupled to the memory controller 515. In certain examples, if the number of detected errors for one or more of the error counts is above a threshold, the bit error can be referred to as an uncorrectable bit error. The management tables 530 can maintain a count of correctable or uncorrectable bit errors, among other things.

The array controller 535 can include, among other things, circuitry or components configured to control memory operations associated with writing data to, reading data from, or erasing one or more memory cells of the memory device 510 coupled to the memory controller 515. The memory operations can be based on, for example, host commands received from the host device 505, or internally generated by the memory manager 525 (e.g., in association with wear leveling, error detection or correction, etc.).

The array controller 535 can include a DICE component 540, which can include, among other things, implement the functions and logic of DICE layer from FIG. 1, and the methods of FIGS. 2, and 3. Layer zero 542 may implement the functions and logic of layer zero from FIG. 1. Similarly, the firmware 544 may implement the firmware of the device.

In some examples, the memory array may comprise a number of NAND dies and one or more functions of the memory controller 515 for a particular NAND die may be implemented on an on-die controller on that particular die. Other organizations and delineations of control functionality may also be utilized, such as a controller for each die, plane, superblock, block, page, and the like.

The memory array 520 can include several memory cells arranged in, for example, a number of devices, semi-conductor dies, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 510 in pages and erased in blocks. However, one or more memory operations (e.g., read, write, erase, etc.) can be performed on larger or smaller groups of memory cells, as desired. The data transfer size of a NAND memory device 510 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 520 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

While FIG. 5 illustrated the operation of the present disclosure in the context of a memory device, in other examples other devices may incorporate the techniques disclosed herein. For example, network interfaces, graphics cards, Random Access Memory (RAM), hard disk drives, and the like.

FIG. 6 illustrates a block diagram of an example machine 600 upon which any one or more of the techniques (e.g., methodologies) discussed herein may be performed. Machine 600 may be an example computing device, with the capabilities as described herein. In alternative embodiments, the machine 600 may operate as a standalone device or may be connected (e.g., networked) to other machines. In a networked deployment, the machine 600 may operate in the capacity of a computing device, component, server machine, a client machine, or both in server-client network environments. In an example, the machine 600 may act as a peer machine in peer-to-peer (P2P) (or other distributed) network environment. The machine 600 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The machine 600, or one or more components of the machine 600, may be configured to implement the components of FIGS. 1, 4, 5; and the methods of FIGS. 2 and 3.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a Peripheral Component Interconnect (PCI), a Peripheral Component Interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a computing device comprising: a hardware processor; a secure storage device; a memory, the memory storing instructions, which when executed, cause the hardware processor to perform operations comprising: during a first boot process of the computing device after a firmware update and before a new firmware object is executed: reading a stored measurement value stored in the secure storage device, the stored measurement value written to the secure storage device during the firmware update; measuring the new firmware object to produce a current firmware measurement; determining whether the current firmware measurement matches the stored measurement value; responsive to determining that the current firmware measurement does not match the stored measurement value, keeping an alias certificate a same value as prior to the firmware update; and responsive to determining that the current firmware measurement matches the stored measurement value, regenerating an alias key pair and alias certificate and booting the firmware, the alias certificate generated based upon a protected device secret and the current firmware measurement, the alias key pair and certificate used to authenticate the computing device.

In Example 2, the subject matter of Example 1 includes, wherein the secure storage device is accessible only by a process executing within a trusted environment, and wherein the operations of reading the stored measurement value comprise reading the stored measurement value within the trusted environment.

In Example 3, the subject matter of Examples 1-2 includes, wherein the operations of measuring the new firmware object to produce the current firmware measurement comprises calculating a cryptographic hash of the new firmware object.

In Example 4, the subject matter of Examples 1-3 includes, wherein the operations of regenerating the alias certificate comprises regenerating the alias certificate according to a Device Identifier Composition Engine (DICE) specification and clearing the stored measurement value.

In Example 5, the subject matter of Examples 1-4 includes, wherein the operations further comprise: as part of a firmware update process: receiving the new firmware object; measuring the new firmware object; writing the new firmware object to a firmware memory location; measuring the new firmware object to produce a measurement; writing the measurement to the secure storage device; and resetting the computing device.

In Example 6, the subject matter of Example 5 includes, wherein the operations further comprise, determine whether the secure storage device is empty, and, responsive to determining the secure storage device is empty, continuing with boot operations according to a DICE specification; and responsive to determining the secure storage device is not empty, performing the operations of reading the stored measurement value, measuring the new firmware object, and determining whether the current firmware measurement matches the stored measurement value.

In Example 7, the subject matter of Examples 1-6 includes, wherein the computing device is a memory device.

In Example 8, the subject matter of Examples 1-7 includes, wherein the secure storage device is an e-fuse that is only accessible to a process running in a trusted execution environment.

In Example 9, the subject matter of Examples 1-8 includes, wherein responsive to determining that the current firmware measurement matches the stored measurement value, regenerating the alias key pair.

In Example 10, the subject matter of Examples 1-9 includes, wherein the operations further comprise using a public key of the alias key pair and the alias certificate to authenticate with a second device.

In Example 11, the subject matter of Examples 1-10 includes, wherein the operations further comprise using a public key of the alias key pair and the alias certificate to authenticate with another component of the computing device.

Example 12 is a method comprising: using one or more processors of a computing device: during a first boot process of the computing device after a firmware update and before a new firmware object is executed: reading a stored measurement value stored in a secure storage device of the computing device, the stored measurement value written to the secure storage device during the firmware update; measuring the new firmware object to produce a current firmware measurement; determining whether the current firmware measurement matches the stored measurement value; responsive to determining that the current firmware measurement does not match the stored measurement value, keeping an alias certificate a same value as prior to the firmware update; during a second boot process of the computing device after a second firmware update and before the second firmware is executed: reading the stored measurement value stored in the secure storage device of the computing device, the stored measurement value written to the secure storage device during the second firmware update; measuring an installed second firmware object to produce the current firmware measurement; determining whether the current firmware measurement matches the stored measurement value; responsive to determining that the current firmware measurement matches the stored measurement value, regenerating an alias key pair and alias certificate and booting the second firmware, the alias certificate generated based upon a protected device secret and the current second firmware measurement, the alias key pair and certificate used to authenticate the computing device.

In Example 13, the subject matter of Example 12 includes, wherein the secure storage device is accessible only by a process executing within a trusted environment, and wherein reading the stored measurement value comprise reading the stored measurement value within the trusted environment.

In Example 14, the subject matter of Examples 12-13 includes, wherein measuring the new firmware object to produce the current firmware measurement comprises calculating a cryptographic hash of the new firmware object.

In Example 15, the subject matter of Examples 12-14 includes, wherein regenerating the alias certificate comprises regenerating the alias certificate according to a Device Identifier Composition Engine (DICE) specification and clearing the stored measurement value.

In Example 16, the subject matter of Examples 12-15 includes, wherein the method further comprises: as part of a firmware update process: receiving the new firmware object; measuring the new firmware object; writing the new firmware object to a firmware memory location; measuring the new firmware object to produce a measurement; writing the measurement to the secure storage device; and resetting the computing device.

In Example 17, the subject matter of Example 16 includes, wherein the operations further comprise, determine whether the secure storage device is empty, and, responsive to determining the secure storage device is empty, continuing with boot operations according to a DICE specification; and responsive to determining the secure storage device is not empty, performing the operations of reading the stored measurement value, measuring the new firmware object, and determining whether the current firmware measurement matches the stored measurement value.

In Example 18, the subject matter of Examples 12-17 includes, wherein the computing device is a memory device.

In Example 19, the subject matter of Examples 12-18 includes, wherein the secure storage device is an e-fuse that is only accessible to a process running in a trusted execution environment.

In Example 20, the subject matter of Examples 12-19 includes, wherein responsive to determining that the current firmware measurement matches the stored measurement value, regenerating the alias key pair.

In Example 21, the subject matter of Examples 12-20 includes, wherein the method further comprises using a public key of the alias key pair and the alias certificate to authenticate with a second device.

In Example 22, the subject matter of Examples 12-21 includes, wherein the method further comprises using a public key of the alias key pair and the alias certificate to authenticate with another component of the computing device.

Example 23 is a non-transitory computer-readable medium, storing instructions, which when executed, cause a computing device to perform operations comprising: during a first boot process of the computing device after a firmware update and before a new firmware object is executed: reading a stored measurement value stored in a secure storage device, the stored measurement value written to the secure storage device during the firmware update; measuring the new firmware object to produce a current firmware measurement; determining whether the current firmware measurement matches the stored measurement value; responsive to determining that the current firmware measurement does not match the stored measurement value, keeping an alias certificate a same value as prior to the firmware update; and responsive to determining that the current firmware measurement matches the stored measurement value, regenerating an alias key pair and alias certificate and booting the firmware, the alias certificate generated based upon a protected device secret and the current firmware measurement, the alias key pair and certificate used to authenticate the computing device.

In Example 24, the subject matter of Example 23 includes, wherein the secure storage device is accessible only by a process executing within a trusted environment, and wherein the operations of reading the stored measurement value comprise reading the stored measurement value within the trusted environment.

In Example 25, the subject matter of Examples 23-24 includes, wherein the operations of measuring the new firmware object to produce the current firmware measurement comprises calculating a cryptographic hash of the new firmware object.

In Example 26, the subject matter of Examples 23-25 includes, wherein the operations of regenerating the alias certificate comprises regenerating the alias certificate according to a Device Identifier Composition Engine (DICE) specification and clearing the stored measurement value.

In Example 27, the subject matter of Examples 23-26 includes, wherein the operations further comprise: as part of a firmware update process: receiving the new firmware object; measuring the new firmware object; writing the new firmware object to a firmware memory location; measuring the new firmware object to produce a measurement; writing the measurement to the secure storage device; and resetting the computing device.

In Example 28, the subject matter of Example 27 includes, wherein the operations further comprise, determine whether the secure storage device is empty, and, responsive to determining the secure storage device is empty, continuing with boot operations according to a DICE specification; and responsive to determining the secure storage device is not empty, performing the operations of reading the stored measurement value, measuring the new firmware object, and determining whether the current firmware measurement matches the stored measurement value.

In Example 29, the subject matter of Examples 23-28 includes, wherein the computing device is a memory device.

In Example 30, the subject matter of Examples 23-29 includes, wherein the secure storage device is an e-fuse that is only accessible to a process running in a trusted execution environment.

In Example 31, the subject matter of Examples 23-30 includes, wherein responsive to determining that the current firmware measurement matches the stored measurement value, regenerating the alias key pair.

In Example 32, the subject matter of Examples 23-31 includes, wherein the operations further comprise using a public key of the alias key pair and the alias certificate to authenticate with a second device.

In Example 33, the subject matter of Examples 23-32 includes, wherein the operations further comprise using a public key of the alias key pair and the alias certificate to authenticate with another component of the computing device.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is a method to implement of any of Examples 1-33.

What is claimed is:

1. A computing device comprising:
a hardware processor;
a secure storage device;
a memory, the memory storing instructions, which when executed, cause the hardware processor to perform operations comprising:
during a first boot process of the computing device after a firmware update and before a new firmware object is executed:
reading a stored measurement value stored in the secure storage device, the stored measurement value being a measurement of the new firmware object taken by the computing device and written to the secure storage device during the firmware update;
measuring the new firmware object to produce a current firmware measurement;

determining whether the current firmware measurement matches the stored measurement value;

responsive to determining that the current firmware measurement does not match the stored measurement value, keeping an alias certificate a same value as prior to the firmware update; and responsive to determining that the current firmware measurement matches the stored measurement value, regenerating an alias key pair and the alias certificate and booting the firmware, the alias certificate regenerated based upon a protected device secret and the current firmware measurement, the alias key pair and the alias certificate used to authenticate the computing device.

2. The computing device of claim 1, wherein the secure storage device is accessible only by a process executing within a trusted environment, and wherein the operations of reading the stored measurement value comprise reading the stored measurement value within the trusted environment.

3. The computing device of claim 1, wherein the operations of measuring the new firmware object to produce the current firmware measurement comprises calculating a cryptographic hash of the new firmware object.

4. The computing device of claim 1, wherein the operations of regenerating the alias certificate comprises regenerating the alias certificate according to a Device Identifier Composition Engine (DICE) specification and clearing the stored measurement value.

5. The computing device of claim 1, wherein the operations further comprise:
as part of a firmware update process:
receiving the new firmware object;
measuring the new firmware object;
writing the new firmware object to a firmware memory location; and
resetting the computing device.

6. The computing device of claim 5, wherein the operations further comprise, determine whether the secure storage device is empty, and, responsive to determining the secure storage device is empty, continuing with boot operations according to a DICE specification; and responsive to determining the secure storage device is not empty, performing the operations of reading the stored measurement value, measuring the new firmware object, and determining whether the current firmware measurement matches the stored measurement value.

7. The computing device of claim 1, wherein the computing device is a memory device.

8. The computing device of claim 1, wherein the secure storage device is an e-fuse that is only accessible to a process running in a trusted execution environment.

9. The computing device of claim 1, wherein the operations further comprise using a public key of the alias key pair and the alias certificate to authenticate with a second device.

10. The computing device of claim 1, wherein the operations further comprise using a public key of the alias key pair and the alias certificate to authenticate with another component of the computing device.

11. A method comprising:
using one or more processors of a computing device:
during a first boot process of the computing device after a firmware update and before a new firmware object is executed:
reading a stored measurement value stored in a secure storage device of the computing device, the stored measurement value being a measurement of the new firmware object taken by the computing device and written to the secure storage device during the firmware update;
measuring the new firmware object to produce a current firmware measurement;
determining whether the current firmware measurement matches the stored measurement value;
responsive to determining that the current firmware measurement does not match the stored measurement value, keeping an alias certificate a same value as prior to the firmware update;
during a second boot process of the computing device after a second firmware update and before the second firmware is executed:
reading the stored measurement value stored in the secure storage device of the computing device, the stored measurement value written to the secure storage device during the second firmware update;
measuring an installed second firmware object to produce the current firmware measurement;
determining whether the current firmware measurement matches the stored measurement value; and
responsive to determining that the current firmware measurement matches the stored measurement value, regenerating an alias key pair and the alias certificate and booting the second firmware, the alias certificate regenerated based upon a protected device secret and the current second firmware measurement, the alias key pair and the alias certificate used to authenticate the computing device.

12. The method of claim 11, wherein the secure storage device is accessible only by a process executing within a trusted environment, and wherein reading the stored measurement value comprise reading the stored measurement value within the trusted environment.

13. The method of claim 11, wherein measuring the new firmware object to produce the current firmware measurement comprises calculating a cryptographic hash of the new firmware object.

14. A non-transitory computer-readable medium, storing instructions, which when executed, cause a computing device to perform operations comprising:
during a first boot process of the computing device after a firmware update and before a new firmware object is executed:
reading a stored measurement value stored in a secure storage device of the computing device, the stored measurement value being a measurement of the new firmware object taken by the computing device and written to the secure storage device during the firmware update;
measuring the new firmware object to produce a current firmware measurement;
determining whether the current firmware measurement matches the stored measurement value;
responsive to determining that the current firmware measurement does not match the stored measurement value, keeping an alias certificate a same value as prior to the firmware update; and
responsive to determining that the current firmware measurement matches the stored measurement value, regenerating an alias key pair and the alias certificate and booting the firmware, the alias certificate regenerated based upon a protected device secret and the current firmware measurement, the alias key pair and the alias certificate used to authenticate the computing device.

15. The non-transitory computer-readable medium of claim 14, wherein the secure storage device is accessible only by a process executing within a trusted environment, and wherein the operations of reading the stored measurement value comprise reading the stored measurement value within the trusted environment.

16. The non-transitory computer-readable medium of claim 14, wherein the operations of measuring the new firmware object to produce the current firmware measurement comprises calculating a cryptographic hash of the new firmware object.

17. The non-transitory computer-readable medium of claim 14, wherein the operations of regenerating the alias certificate comprises regenerating the alias certificate according to a Device Identifier Composition Engine (DICE) specification and clearing the stored measurement value.

18. The non-transitory computer-readable medium of claim 14, wherein the operations further comprise: as part of a firmware update process:
receiving the new firmware object;
measuring the new firmware object;
writing the new firmware object to a firmware memory location;
and
resetting the computing device.

19. The non-transitory computer-readable medium of claim 18, wherein the operations further comprise, determine whether the secure storage device is empty, and, responsive to determining the secure storage device is empty, continuing with boot operations according to a DICE specification; and responsive to determining the secure storage device is not empty, performing the operations of reading the stored measurement value, measuring the new firmware object, and determining whether the current firmware measurement matches the stored measurement value.

* * * * *